United States Patent
Ahn et al.

(10) Patent No.: US 9,337,980 B2
(45) Date of Patent: May 10, 2016

(54) METHOD FOR CONTROLLING UPLINK TRANSMISSION POWER AND WIRELESS DEVICE USING SAME

(71) Applicant: LG ELECTRONICS INC., Seoul (KR)

(72) Inventors: Joon Kui Ahn, Anyang-si (KR); Suck Chel Yang, Anyang-si (KR); Yun Jung Yi, Anyang-si (KR); Dong Youn Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 95 days.

(21) Appl. No.: 14/112,482

(22) PCT Filed: Sep. 28, 2012

(86) PCT No.: PCT/KR2012/007930
§ 371 (c)(1),
(2) Date: Oct. 17, 2013

(87) PCT Pub. No.: WO2013/048188
PCT Pub. Date: Apr. 4, 2013

(65) Prior Publication Data
US 2014/0050205 A1 Feb. 20, 2014

Related U.S. Application Data

(60) Provisional application No. 61/541,044, filed on Sep. 29, 2011, provisional application No. 61/554,493, filed on Nov. 1, 2011, provisional application No. 61/591,279, filed on Jan. 27, 2012, provisional (Continued)

(51) Int. Cl.
*H04W 84/12* (2009.01)
*H04L 5/00* (2006.01)
(Continued)

(52) U.S. Cl.
CPC ............ *H04L 5/0048* (2013.01); *H04L 5/0037* (2013.01); *H04L 5/0051* (2013.01);
(Continued)

(58) Field of Classification Search
CPC ....... H04L 5/00; H04L 5/0037; H04L 5/0048; H04L 5/0051; H04L 5/0098; H04L 5/001; H04L 12/26; H04W 52/367; H04W 52/325; H04W 52/196; H04W 52/50; H04W 52/30; H04W 52/365; H04W 52/34; H04W 72/0413; H04W 72/04; H04W 72/12; H04W 72/1289; H04W 56/0005; H04W 56/00; H04W 56/001; H04W 56/0045; H04W 74/08; H04W 74/0833; H04W 74/006; H04W 88/02; H04W 28/06; H04W 4/00; H04W 36/00
USPC .......... 370/336, 329, 252, 242, 331, 328, 241
See application file for complete search history.

(56) References Cited

U.S. PATENT DOCUMENTS

| | | | |
|---|---|---|---|
| 9,008,050 B2 * | 4/2015 | Feuersanger | H04W 52/281 370/336 |
| 2006/0003787 A1 | 1/2006 | Heo et al. | |

(Continued)

FOREIGN PATENT DOCUMENTS

| KR | 10-2005-0118063 A | 12/2005 |
|---|---|---|
| WO | WO 2011/081853 A1 | 7/2011 |
| WO | WO 2011/105856 A2 | 9/2011 |

*Primary Examiner* — Andrew Chriss
*Assistant Examiner* — Rasha Fayed
(74) *Attorney, Agent, or Firm* — Birch, Stewart, Kolasch & Birch, LLP

(57) ABSTRACT

Provided are a method for controlling uplink transmission power and a wireless device. The wireless device decides a first transmission power of a first uplink channel, which is transmitted through a first wireless resource from a first serving cell, and decides a second transmission power of a second uplink channel, which is transmitted through a second wireless resource from a second serving cell. The first serving cell belongs to a first timing advance (TA) group, and the second serving cell belongs to a second TA group that differs from the first TA group. All or a portion of the first wireless resource and the second wireless resource overlap, wherein the sum of the first and second transmission powers in the overlapping portion is decided so as not to exceed a maximum transmission power.

13 Claims, 14 Drawing Sheets

Related U.S. Application Data application No. 61/611,590, filed on Mar. 16, 2012, provisional application No. 61/613,467, filed on Mar. 20, 2012, provisional application No. 61/644,439, filed on May 9, 2012, provisional application No. 61/645,566, filed on May 10, 2012, provisional application No. 61/667,935, filed on Jul. 3, 2012, provisional application No. 61/678,120, filed on Aug. 1, 2012, provisional application No. 61/681,636, filed on Aug. 10, 2012.

(51) Int. Cl.
*H04W 52/14* (2009.01)
*H04W 52/36* (2009.01)
*H04W 72/04* (2009.01)
*H04W 56/00* (2009.01)
*H04W 4/00* (2009.01)
*H04W 52/32* (2009.01)

(52) U.S. Cl.
CPC ........... *H04L5/0053* (2013.01); *H04W 52/146* (2013.01); *H04W 52/32* (2013.01); *H04W 52/367* (2013.01); *H04W 56/0005* (2013.01); *H04W 56/0045* (2013.01); *H04W 72/0413* (2013.01); *H04W 4/00* (2013.01); *H04W 52/325* (2013.01)

(56) References Cited

U.S. PATENT DOCUMENTS

| | | | |
|---|---|---|---|
| 2010/0103902 A1* | 4/2010 | Kim | H04L 5/0048 370/330 |
| 2010/0246561 A1* | 9/2010 | Shin | H04W 52/32 370/345 |
| 2011/0268028 A1* | 11/2011 | Stern-Berkowitz | H04L 27/2613 370/328 |
| 2012/0257570 A1* | 10/2012 | Jang | H04L 1/1854 370/328 |
| 2012/0300715 A1* | 11/2012 | Pelletier | H04W 56/0005 370/329 |
| 2012/0300752 A1* | 11/2012 | Kwon | H04W 56/0005 370/336 |
| 2012/0314640 A1 | 12/2012 | Kim et al. | |
| 2013/0028204 A1* | 1/2013 | Dinan | H04W 72/0453 370/328 |
| 2013/0114505 A1* | 5/2013 | Haim | H04W 52/146 370/328 |
| 2013/0279433 A1* | 10/2013 | Dinan | H04W 56/0005 370/329 |
| 2014/0307670 A1* | 10/2014 | Kim | H04W 74/0833 370/329 |

* cited by examiner (A)

(B)

(A)

(B)

(C)

(D)

METHOD FOR CONTROLLING UPLINK TRANSMISSION POWER AND WIRELESS DEVICE USING SAME

CROSS-REFERENCE TO RELATED APPLICATIONS

This application is the National Phase of PCT/KR2012/007930 filed on Sep. 28, 2012, which claims the benefit of priority under 35 U.S.C. 119(e) to U.S. Provisional applications No. 61/541,044 filed on Sep. 29, 2011, No. 61/554,493 filed on Nov. 1, 2011, No. 61/591,279 filed on Jan. 27, 2012, No. 61/611,590 filed on Mar. 16, 2012, No. 61/613,467 filed on Mar. 20, 2012, No. 61/644,439 filed on May 9, 2012, No. 61/645,566 filed on May 10, 2012, No. 61/667,935 filed on Jul. 3, 2012, No. 61/678,120 filed on Aug. 1, 2012 and No. 61/681,636 filed on Aug. 10, 2012, all of which are hereby expressly incorporated by reference in their entirety herein.

TECHNICAL FIELD

The present invention relates to wireless communications, and more particularly, to a method for controlling an uplink transmit power in a wireless communication system, and a wireless device using the method.

BACKGROUND ART $3^{rd}$ generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

As disclosed in 3GPP TS 36.211 V8.7.0 (2009-05) "Evolved Universal Terrestrial Radio Access (E-UTRA); Physical Channels and Modulation (Release 8)", a physical channel of the LTE can be classified into a downlink channel, i.e., a physical downlink shared channel (PDSCH) and a physical downlink control channel (PDCCH), and an uplink channel, i.e., a physical uplink shared channel (PUSCH) and a physical uplink control channel (PUCCH).

To decrease an interference caused by uplink transmission between user equipments (UEs), it is important for a base station (BS) to maintain uplink time alignment of the UEs. The UE may be located in any area in a cell. An uplink signal transmitted by the UE may arrive to the BS at a different time according to the location of the UE. A signal arrival time of a UE located in a cell edge is longer than a signal arrival time of a UE located in a cell center. On the contrary, the signal arrival time of the UE located in the cell center is shorter than the signal arrival time of the UE located in the cell edge.

To decrease the interference between the UEs, the BS needs to perform scheduling so that uplink signals transmitted by the UEs in the cell can be received every time within a boundary. The BS has to properly adjust transmission timing of each UE according to a situation of each UE. Such an adjustment is called an uplink time alignment. A random access process is one of processes for maintaining the uplink time alignment. The UE acquires a time alignment value (or also referred to as a timing advance (TA)) through the random access process, and maintains the uplink time alignment by applying the time alignment value.

In addition, a transmit power of the UE needs to be adjusted to mitigate an interference caused by uplink transmission. It is difficult for the BS to receive uplink data if the transmit power of the UE is too low. If the transmit power of the UE is too high, uplink transmission may cause a significant interference to transmission of another UE.

Recently, multiple serving cells are introduced to provide a higher data rate. However, the same time alignment value has been applied to all serving cells under the assumption that serving cells have adjacent frequencies or have similar propagation properties.

There is a need for a method capable of adjusting an uplink transmit power between a plurality of serving cells when configuring the plurality of serving cells to which different time alignment values are applied.

DISCLOSURE OF THE INVENTION

The present invention provides a method of controlling an uplink transmit power among a plurality of timing advance (TA) groups, and a wireless device using the method.

In one aspect, there is provided a method of controlling an uplink transmit power in a wireless communication system. The method may comprise determining a first transmit power of a first uplink channel to be transmitted using a first radio resource to a first serving cell and determining a second transmit power of a second uplink channel to be transmitted using a second radio resource to a second serving cell. The first serving cell belongs to a first timing advance (TA) group, and the second serving cell belongs to a second TA group different from the first TA group. The first radio resource and the second radio resource entirely or partially overlap. A sum of the first and second transmit powers in the overlapping portion is determined not to exceed a maximum transmit power.

The first and second radio resources may be at least one subframe including a plurality of orthogonal frequency division multiplexing (OFDM) symbols.

At least any one of the first and second transmit powers may be adjusted based on a subframe boundary.

The first and second uplink channels may include at least any one of a physical uplink shared channel (PUSCH), a physical uplink control channel (PUCCH), a physical random access channel (PRACH), and a sounding reference signal (SRS).

In other aspect, there is provided a wireless device for controlling an uplink transmit power in a wireless communication system. The wireless device may comprise a radio frequency (RF) unit for transmitting and receiving a radio signal; and a processor operatively coupled to the RF unit. The processor may be configured for: determining a first transmit power of a first uplink channel to be transmitted using a first radio resource to a first serving cell and determining a second transmit power of a second uplink channel to be transmitted using a second radio resource to a second serving cell. The first serving cell belongs to a first timing advance (TA) group, and the second serving cell belongs to a second TA group different from the first TA group. The first radio resource and the second radio resource entirely or partially overlap. A sum of the first and second transmit powers in the overlapping portion is determined not to exceed a maximum transmit power.

Advantageous Effects

When a plurality of timing advance (TA) groups are configured, an uplink transmit power can be adjusted among cells belonging to different TA groups.

MODES FOR CARRYING OUT THE PREFERRED EMBODIMENTS

A wireless device may be fixed or may have mobility, and may be referred to as another term such as a User Equipment (UE), a mobile station (MS), a user terminal (UT), a subscriber station (SS), or a mobile terminal (MT). In general, the base station may refer to a fixed station communicating with a wireless device, and also may be referred to as another term such as an evolved-NodeB (eNB), a Base Transceiver System (BTS), or an Access Point.

Hereinafter, it will be described that the present invention is applied based on 3rd Generation Partnership Project (3GPP) long term evolution (LTE) or 3GPP LTE-Advanced (LTE-A). This is for exemplary purposes, and the present invention may be applicable to various wireless communication systems. Hereinafter, LTE includes the LTE and/or the LTE-A.

Figure 1:
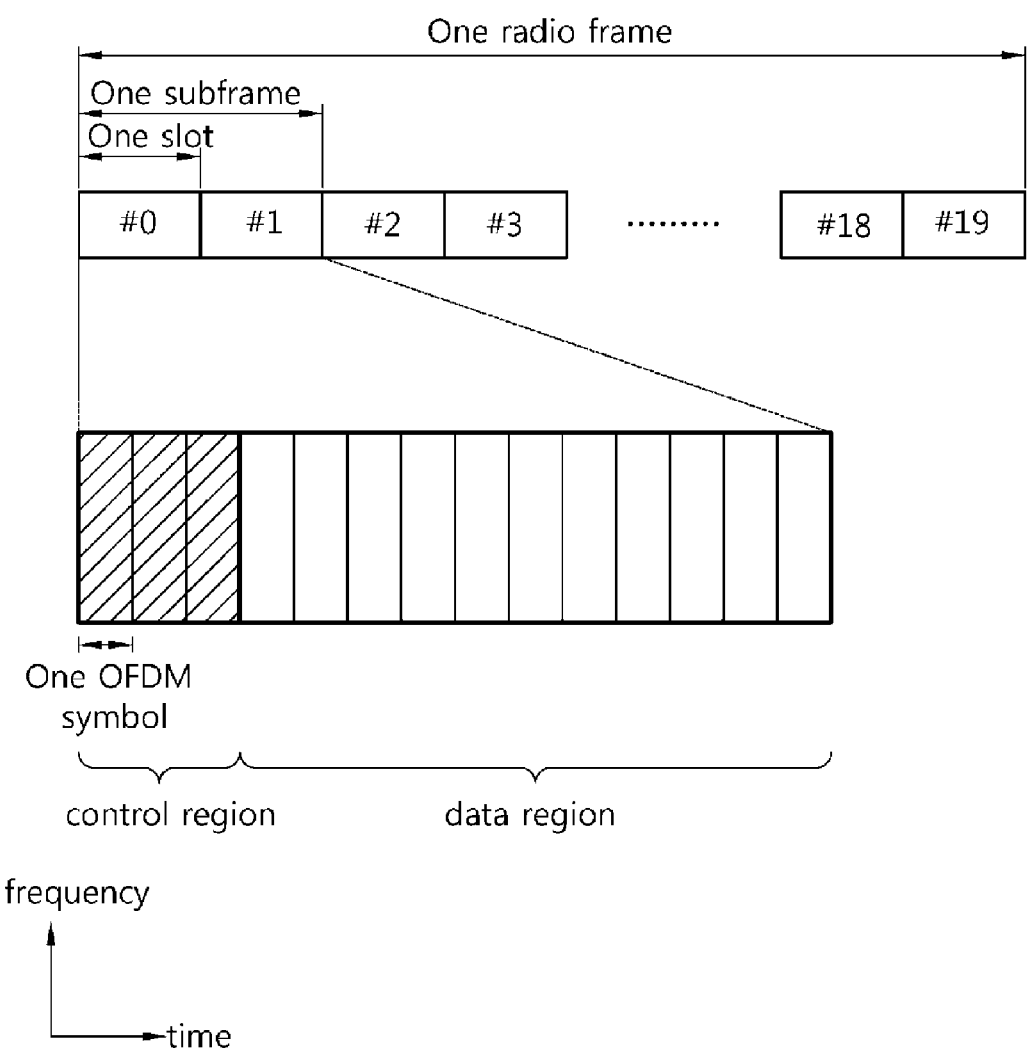
FIG. 1 shows a downlink radio frame structure in 3$^{rd}$ generation partnership project (3GPP) long term evolution (LTE).

FIG. 1 illustrates a structure of a downlink radio frame in the 3GPP LTE. This may refer to paragraph 6 of 3GPP TS 36.211 V8.7.0 (2009-05) "Evolved Universal Terrestrial Radio Access (E-UTRA); Physical Channels and Modulation (Release 8)".

A radio frame includes 10 subframes numbered with indices 0 to 9. One subframe includes two consecutive slots. The time required to transmit one subframe is called a transmission time interval (TTI). For example, the length of one subframe may be 1 ms and the length of slot may be 0.5 ms.

One slot may include a plurality of orthogonal frequency division multiplexing (OFDM) symbols in a time zone. Since the 3GPP LTE uses orthogonal frequency division multiple access (OFDMA) in a downlink (DL), the OFDM symbol is only to express one symbol period in a time zone and thus does not limit a multiple access scheme or name. For example, the OFDM symbol may be called different names such as a single carrier-frequency division multiple access (SC-FDMA) symbol and a symbol period.

Although it is exemplarily described that one slot includes 7 OFDM symbols, the number of OFDM symbols in one slot may vary depending on the length of a Cyclic Prefix (CP). According to 3GPP TS 36.211 V8.7.0, one slot in a regular CP includes seven OFDM symbols and one slot in an extended CP includes six OFDM symbols.

A resource block (RB) is a resource allocation unit and includes a plurality of subcarriers in one slot. For example, if one slot includes seven OFDM symbols in a time zone and a RB includes twelve subcarriers in a frequency domain, one RB may include 7×12 resource elements (REs).

A DL subframe is divided into a control region and a data region in a time zone. The control region includes up to three OFDM symbols in the front of a first slot in a subframe, but the number of OFDM symbols in the control region may vary. A Physical Downlink Control Channel (PDCCH) and another control channel are allocated to the control region and a PDSCH is allocated to the data region.

As disclosed in 3GPP TS 36.211 V8.7.0, a physical channel in the 3GPP LTE may be divided into a data channel (i.e. a Physical Downlink Shared Channel (PDSCH) and a Physical Uplink Shared Channel (PUSCH)) and a control channel (i.e. a Physical Downlink Control Channel (PDCCH), a Physical Control Format Indicator Channel (PCFICH), a Physical Hybrid-ARQ Indicator Channel (PHICH), and a Physical Uplink Control Channel (PUCCH)).

The PCFICH transmitted from the first OFDM symbol of a subframe carries a control format indicator (CFI) for the number of OFDM symbols (i.e. the size of a control region) used for the transmission of control channels in the subframe. A terminal receives the CFI first on the PCFICH and then monitors the PDCCH.

Unlike the PDCCH, the PCFICH does not use blind decoding and is transmitted through the fixed PCFICH resource of a subframe.

The PHICH carries a positive-acknowledgement (ACK)/negative-acknowledgement (NACK) signal for a hybrid automatic repeat request (HARQ). The ACK/NACK signal for uplink (UL) data on the PUSCH, which is transmitted by a terminal, is transmitted on the PHICH.

A Physical Broadcast Channel (PBCH) is transmitted from the front four OFDM symbols of the second slot in the first subframe of a radio frame. The PBCH carries system information essential when a terminal communicates with a base station, and the system information transmitted through the PBCH is called a master information block (MIB). Compared to this, the system information, which is transmitted on the PDSCH indicated by the PDCCH, is called a system information block (SIB).

The control information transmitted through the PDCCH is called as downlink control information (DCI). The DCI may include the resource allocation of a PDSCH (also, referred to as DL grant), the resource allocation of a PUSCH (also, referred to as UL grant), a set of transmit power control commands on each UE in an arbitrary UE group, and/or the activation of a Voice over Internet Protocol (VoIP).

The 3GPP LTE uses blind decoding to detect a PDCCH. The blind decoding demasks a desired identifier on CRC of a received PDCCH (also, referred to as a candidate PDCCH), and checks CRC errors in order to confirm whether a corresponding PDCCH is its control channel.

A base station determines a PDCCH format according to DCI to be transmitted to a terminal, attaches Cyclic Redundancy Check (CRC) to the DCI, and then, masks a unique identifier (also, referred to as a Radio Network Temporary Identifier (RNTI)) on the CRC according to the owner or purpose of a PDCCH.

The control region in a subframe includes a plurality of control channel element (CCEs). The CCE is a logical allocation unit used to provide an encoding rate according to a state of a radio channel to a PDCCH and corresponds to a plurality of resource element groups (REGs). The REG includes a plurality of resource elements. According to a linkage between the number of CCEs and an encoding rate provided by the CCEs, the format of a PDCCH and the number of available bits in the PDCCH are determined.

One REG includes four REs and one CCE includes nine REGs. In order to configure one PDCCH, {1, 2, 4, and 8} CCEs may be used and an element of each of {1, 2, 4, and 8} CCEs is referred to as a CCE aggregation level.

A base station determines the number of CCEs used for the transmission of a PDDCH according to a channel state. For example, one CCE may be used for PDCCH transmission to a terminal having a good DL channel state. Eight CCEs may be used for PDCCH transmission to a terminal having a poor DL channel state.

A control channel configured with one or more CCE performs interleaving by a REG unit, and after a cell identifier (ID) based cyclic shift is performed, is mapped into a physical resource.

According to 3GPP TS 36.211 V8.7.0, a DL channel includes a PUSCH, a PUCCH, a Sounding Reference Signal (SRS), and a Physical Random Access Channel (PRACH).

The PUCCH supports a multi-format. According to a modulation scheme depending on the PUCCH format, a PUCCH having the different number of bits per subframe may be used. A PUCCH format 1 is used for the transmission of a Scheduling Request (SR), a PUCCH format 1 a/ab is used for the transmission of an ACK/NACK signal for a HARQ, a PUCCH format 2 is used for the transmission of a CQI, and a PUCCH format 2 a/2 b is used for the simultaneous transmission of CQI and an ACK/NACK signal. When only the ACK/NACK signal is transmitted in a subframe, the PUCCH format 1 a/1 b is used, and when the SR is transmitted alone, the PUCCH format 1 is used. When the SR and ACK/NACK are simultaneously transmitted, the PUCCH format 1 is used, and an ACK/NACK signal is modulated and transmitted in a resource allocated to the SR.

Hereinafter, maintaining UL time alignment in the 3GPP LTE will be described.

In order to reduce the interference caused by UL transmission between terminals, it is important for a base station to maintain UL time alignment of a terminal. A terminal may be located in an arbitrary area within a cell, and the reaching time that an uplink signal that a terminal transmits takes time to reach a base station may vary depending on the position of each terminal. The reaching time of a terminal located at a cell edge is longer than that of a terminal located at the middle of a cell. On the contrary, the reaching time of a terminal located at the middle of a cell is shorter than that located at a cell edge.

In order to reduce the interference between terminals, it is necessary for a base station to arrange a schedule to allow UL signals that terminals in a cell transmit to be received within each time boundary. A base station is required to appropriately adjust the transmission timing of each terminal depending on the situation thereof, and this adjustment is called time alignment maintenance.

One method of managing time alignment includes a random access process. A terminal transmits a random access preamble to a base station. The base station calculates a time alignment value for fast or slow transmission timing of the terminal on the basis of the received random access preamble. Then, the base station transmits a random access response including the calculated alignment value to the terminal. The terminal updates the transmission timing by using the time alignment value.

As another method, a base station receives an SRS periodically or arbitrarily from a terminal, calculates a time alignment value of the terminal through the SRS, and then, notifies it to the terminal through a MAC control element (CE).

The time alignment value is information transmitted from a base station to a terminal in order to maintain UL time alignment, and a Timing Alignment Command indicates the information.

In general, since a terminal has mobility, the transmission timing of the terminal may vary according to the moving speed and position of the terminal. Accordingly, the time alignment value that the terminal receives may be effective for a specific time. For this, a Time Alignment Timer is used.

After receiving a time alignment value from a base station and then updating time alignment, a terminal starts or restarts a time alignment timer. Only when the time alignment timer operates, UL transmission is available in the terminal. A value of the time alignment timer may be notified from a base station to a terminal through system information or an RRC message such as a Radio Bearer Reconfiguration message.

When the time alignment timer expires or does not operate, under the assumption that a base station is out of time alignment, a terminal does not transmit any UL signal except for a random access preamble.

Figure 2:
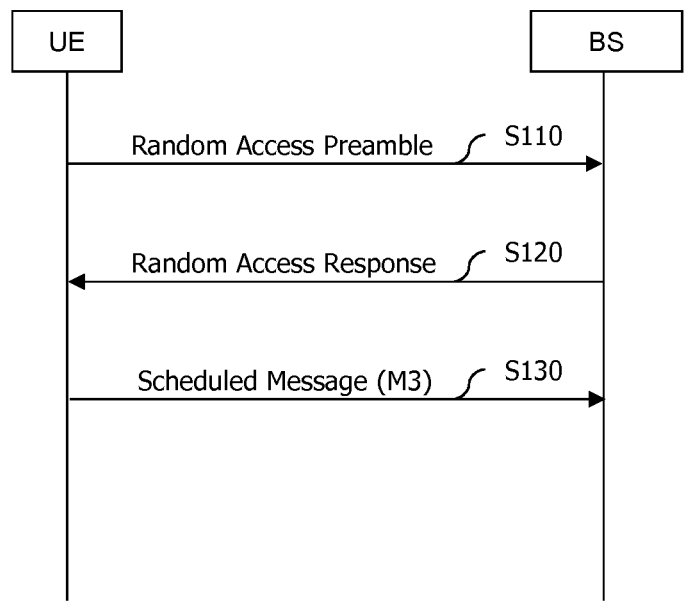
FIG. 2 is a flowchart showing a random access procedure in 3GPP LTE.

FIG. 2 is a flowchart illustrating a random access process in 3GPP LTE. The random access process is used for a terminal to obtain UL alignment with a base station or to receive a UL radios resource allocated.

A terminal receives a root index and a physical random access channel (PRACH) configuration index from a base station. Each includes 64 candidate random access preambles defined by a Zadoff-Chu (ZC) sequence, and the root index is a logical index for a terminal to generate the 64 candidate random access preambles.

The transmission of a random access preamble is limited to a specific time and a frequency resource in each cell. The PRACH configuration index indicates a specific subframe and a preamble format available for the transmission of a random access preamble.

Table 1 below is one example of a random access configuration disclosed in paragraph 5.7 of 3GPP TS 36.211 V8.7.0 (2009-05).

TABLE 1

| PRACH configuration index | Preamble format | System frame number | Subframe number |
|---|---|---|---|
| 0 | 0 | Even | 1 |
| 1 | 0 | Even | 4 |
| 2 | 0 | Even | 7 |
| 3 | 0 | Any | 1 |
| 4 | 0 | Any | 4 |
| 5 | 0 | Any | 7 |
| 6 | 0 | Any | 1, 6 |

A terminal transmits an arbitrarily-selected random access preamble to a base station in operation S110. The terminal selects one of 64 candidate random access preambles. Then, the terminal selects a subframe corresponding to a PRACH configuration index. The terminal transmits the selected random access preamble in the selected subframe.

The base station receiving the random access preamble transmits a random access response (PAR) to the terminal in operation S120. The random access response is detected in two steps. First, the terminal detects a PDCCH masked with random access (RA)-RNTI. The terminal receives a random access response in a Medium Access Control (MAC) Protocol Data Unit (PDU) on a PDSCH indicated by the detected PDCCH.

Figure 3:
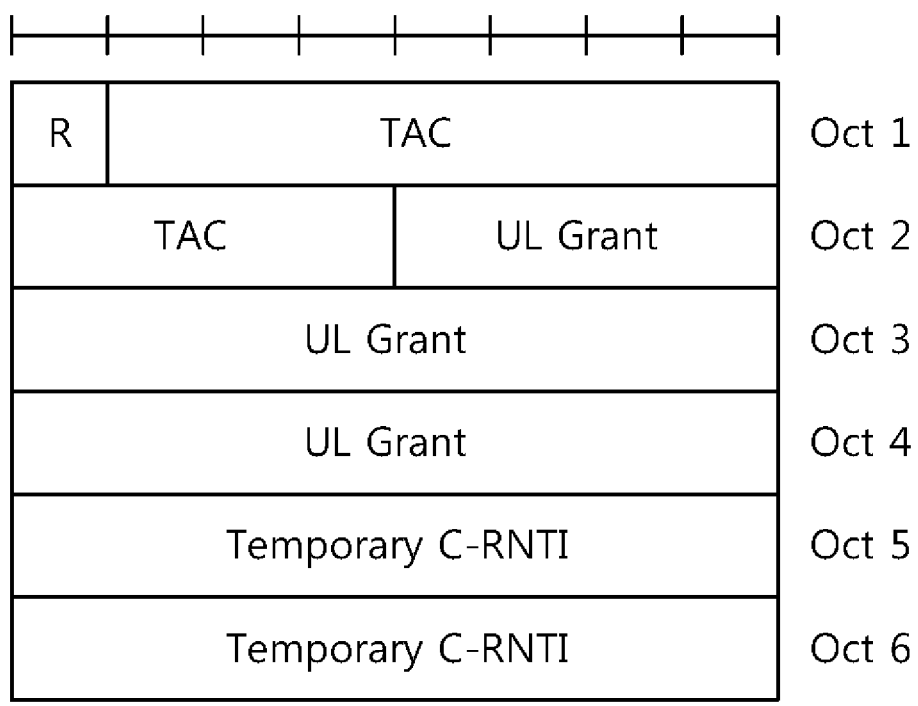
FIG. 3 shows an example of a random access response.

FIG. 3 is a view of a random access response.

The random access response may include TAC, UL grant, and temporary C-RNTI.

The TAC is information indicating a time alignment value transmitted from a base station to a terminal in order to maintain UL time alignment. The terminal updates the UL transmission timing by using the time alignment value. Once updating the time alignment, the terminal starts or restarts a Time Alignment Timer.

The UL grant includes UL resource allocation and a transmit power command (TPC), which are used for the transmission of a scheduling message that will be described later. The TPC is used for determining transmit power for a scheduled PUSCH.

Referring to FIG. 2 again, the terminal transmits a message, which is scheduled according to the UL grant in the random access response, to the base station in operation S130.

Hereinafter, a random access preamble may be referred to as a message M1, a random access response may be referred to as a message M2, and a scheduled message may be referred to as a message M3.

From now on, referring to paragraph 5 of 3GPP TS 36.213 V8.7.0 (2009-05), UL transmit power in 3GPP LTE will be described.

A transmit power $P_{PUSCH}(i)$ for PUSCH transmission in a subframe i is defined as follows.

$$P_{PUSCH}(i) = \min\{P_{CMAX}, 10\log_{10}(M_{PUSCH}(i)) + P_{O\_PUSCH}(j) + \alpha(j)PL + \Delta_{TF}(i) + f(i)\}$$ [Equation 1]

where $P_{CMAX}$ is configured terminal transmit power and $M_{PUSCH}(i)$ is a bandwidth of PUSCH resource allocation of an RB unit. $P_{O\_PUSCH}(j)$ is a parameter consisting of the sum of a cell specific factor given in an upper layer $P_{O\_NOMINAL\_PUSCH}(j)$ and a terminal specific factor $P_{O\_UE\_PUSCH}(j)$ when j=0 and 1. $\alpha(j)$ is a parameter given in an upper layer. PL is path loss estimation calculated by a terminal. $\Delta_{TF}(i)$ is a terminal specific parameter. f(i) is a terminal specific value obtained from TPC. min{A,B} is a function for outputting a smaller value of A and B.

A transmit power $P_{PUCCH}(i)$ for PUCCH transmission in a subframe i is defined as follows.

$$P_{PUCCH}(i) = \min\{P_{CMAX}, P_{O\_PUCCH} + PL + h(n_{CQI}, n_{HARQ}) + \Delta_{F\_PUCCH}(F) + g(i)\}$$ [Equation 2]

where $P_{CMAX}$ and PL are the same as those in Equation 1. $P_{O\_PUCCH}(j)$ is a parameter consisting of the sum of a cell specific factor given in an upper layer $P_{O\_NOMINAL\_PUCCH}(j)$ and a terminal specific factor $P_{O\_UE\_PUCCH}(j)$. $h(n_{CQI}, n_{HARQ})$ is a value dependent on a PUCCH format. $\Delta_{F\_PUCCH}(F)$ is a parameter given by an upper layer. g(i) is a terminal specific value obtained from TPC.

A transmit power $P_{SRS}(i)$ for SRS transmission in a subframe i is defined as follows.

$$P_{SRS}(i) = \min\{P_{CMAX}, P_{SRS\_OFFSET} + 10\log_{10}(M_{SRS}) + P_{O\_PUSCH}(j) + \alpha(j)PL + f(i)\}$$ [Equation 3]

where $P_{CMAX}$, $P_{O\_PUSCH}(j)$, $\alpha(j)$, PL and f(i) are the same as those in Equation 1. $P_{SRS\_OFFSET}$ represents a terminal specific parameter given in an upper layer, and $M_{SRS}$ represents a bandwidth for SRS transmission.

PH(i) in a subframe I is defined as follows.

$$PH(i) = P_{CMAX} - \{10\log_{10}(M_{PUSCH}(i)) + P_{O\_PUSCH}(j) + \alpha(j)PL + \Delta_{TF}(i) + f(i)\}$$ [Equation 4]

Hereinafter, a multiple carrier system will be described.

A 3GPP LTE system supports the case that a DL bandwidth and a UL bandwidth are configured differently, but this requires one component carrier (CC). The 3GPP LTE system supports up to 20 MHz, and supports only one CC to each of UL and DL when a UL bandwidth and a DL bandwidth are different.

Spectrum aggregation (or, referred to as bandwidth aggregation and carrier aggregation) supports a plurality of CCs. For example, if five CCs are allocated as granularity of a carrier unit having a 20 MHz bandwidth, the 3GPP LTE system may support the maximum bandwidth of 100 Mhz One DL CC or a pair of a UL CC and a DL CC may correspond to one cell. Accordingly, a terminal communicating with a base station through a plurality of DL CCs may receive service from a plurality of serving cells.

Figure 4:
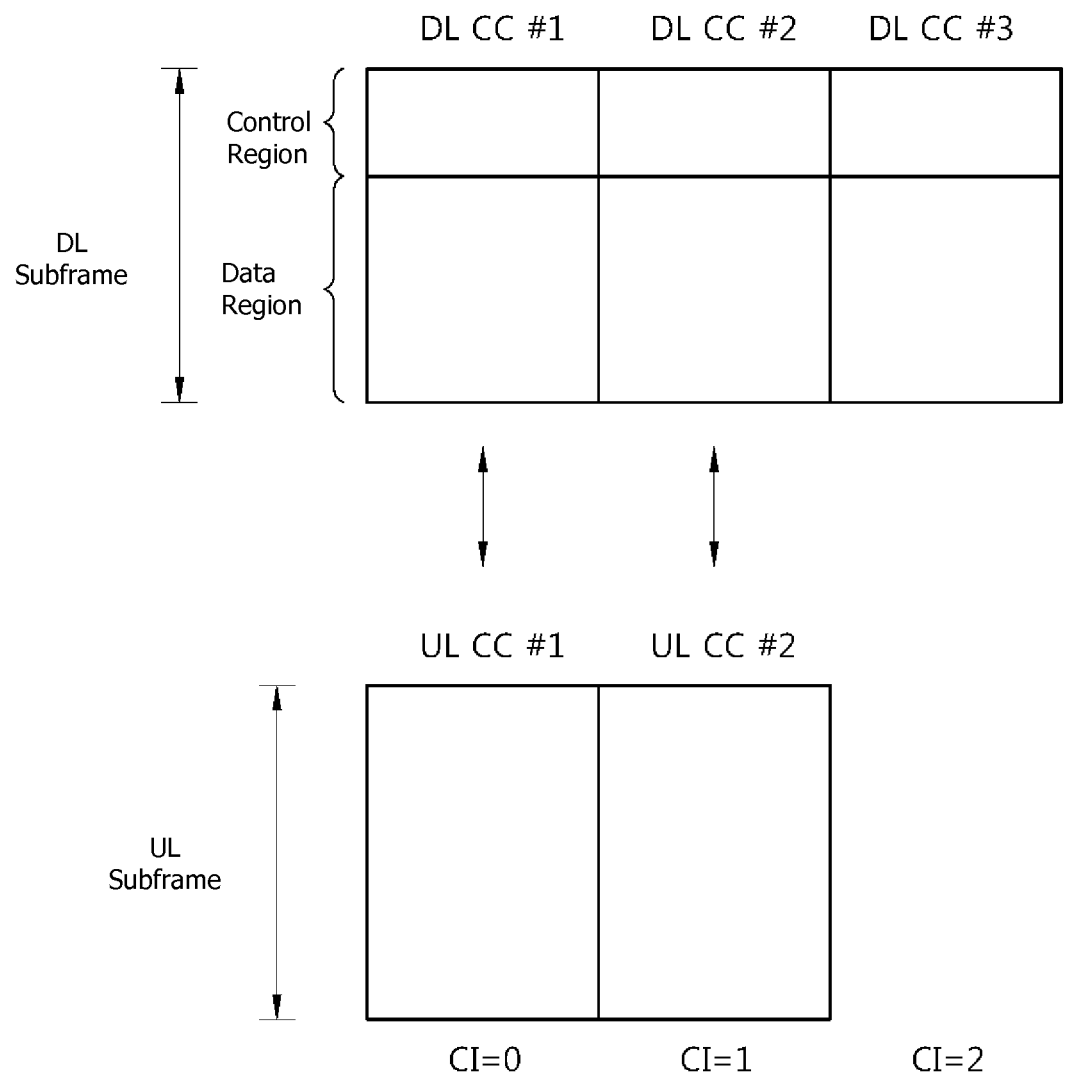
FIG. 4 shows an example of multiple carriers.

FIG. 4 illustrates an example of a multiple carrier.

There are three DL CCs and three UL CCs, but their numbers are not limited thereto. In each DL CC, a PDCCH and a PDSCH are separately transmitted, and in each UL CC, a PUCCH and a PUSCH are separately transmitted. Since three pairs of DL CCs-UL CCs are defined, a terminal may receive service from three serving cells.

A terminal may monitor a PDCCH in a plurality of DL CCs, and simultaneously may receive a DL transmission block through a plurality of DL CCs. A terminal may transmit a plurality of UL transmission blocks simultaneously through a plurality of UL CCs.

It is assumed that a pair of DL CC #1 and UL CC #1 becomes a first serving cell, a pair of DL CC #2 and UL CC #2 becomes a second cell, and a DL CC #3 becomes a third serving cell. Each serving cell may be identified through a Cell index (CI). The CI may be unique in a cell or UE-specific. Here, the example that CI=0, 1, 2 are assigned to the first to third serving cells is shown in FIG. 4.

The serving cell may be divided into a primary cell pcell and a secondary cell scell. The primary cell operates in a primary frequency, and is a cell designated as a primary cell when a terminal performs an initial connection establishing process or starts a connection re-establishing process, or performs a hand-over process. The primary cell is also called a reference cell. The secondary cell may operate in a secondary frequency, may be configured after RRC connection is established, and may be used for providing an additional radio resource. At least one primary cell is always configured, and a secondary cell may be added/edited/released by an upper layer signaling (for example, an RRC message).

The CI of a primary cell may be fixed. For example, the lowest CI may be designated as the CI of a primary cell. Hereinafter, the CI of a primary cell is 0 and the CI of a secondary cell is sequentially allocated from 1.

A terminal may monitor a PDCCH through a plurality of serving cells. However, even when there are N number of serving cells, a base station may be configured to monitor a PDCCH for the M (M≤al) number of serving cells. Additionally, a base station may be configured to first monitor a PDCCH for the L (L≤M≤N) number of serving cells.

Even if a terminal supports a plurality of serving cells in an existing 3GPP LTE, one Timing Alignment (TA) value may be commonly applied to a plurality of serving cells. However, a plurality of serving cells are greatly far from a frequency domain, so that their propagation characteristics may vary.

For example, in order to expand coverage or remove coverage hole, a Remote Radio Header (RRH) and devices may exist in an area of a base station.

Figure 5:
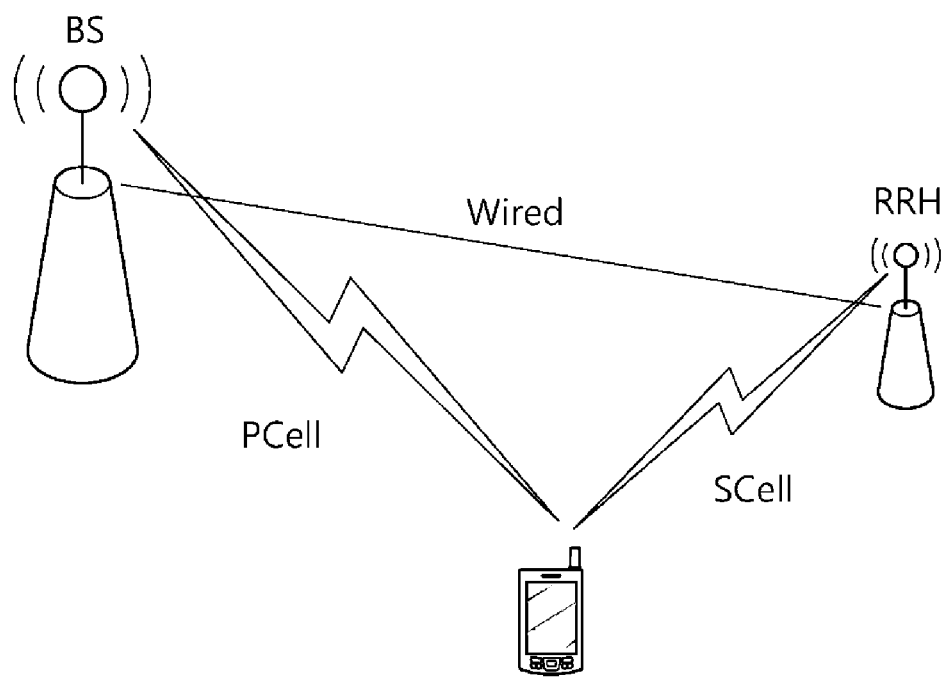
FIG. 5 shows an uplink (UL) propagation difference among multiple cells.

FIG. 5 illustrates a UL propagation difference between a plurality of cells.

A terminal receives service through a primary cell and a secondary cell. The primary cell provides service by a base station and the secondary cell provides service by an RRH connected to a base station. The propagation delay characteristics of the primary cell and the secondary cells may vary due to the reasons such as the distance between a base station and an RRH and a processing time of an RRH.

In this case, when the same TA value is applied to the primary cell and the secondary cell, it may have a significant impact on the alignment of a UL signal.

Figure 6:
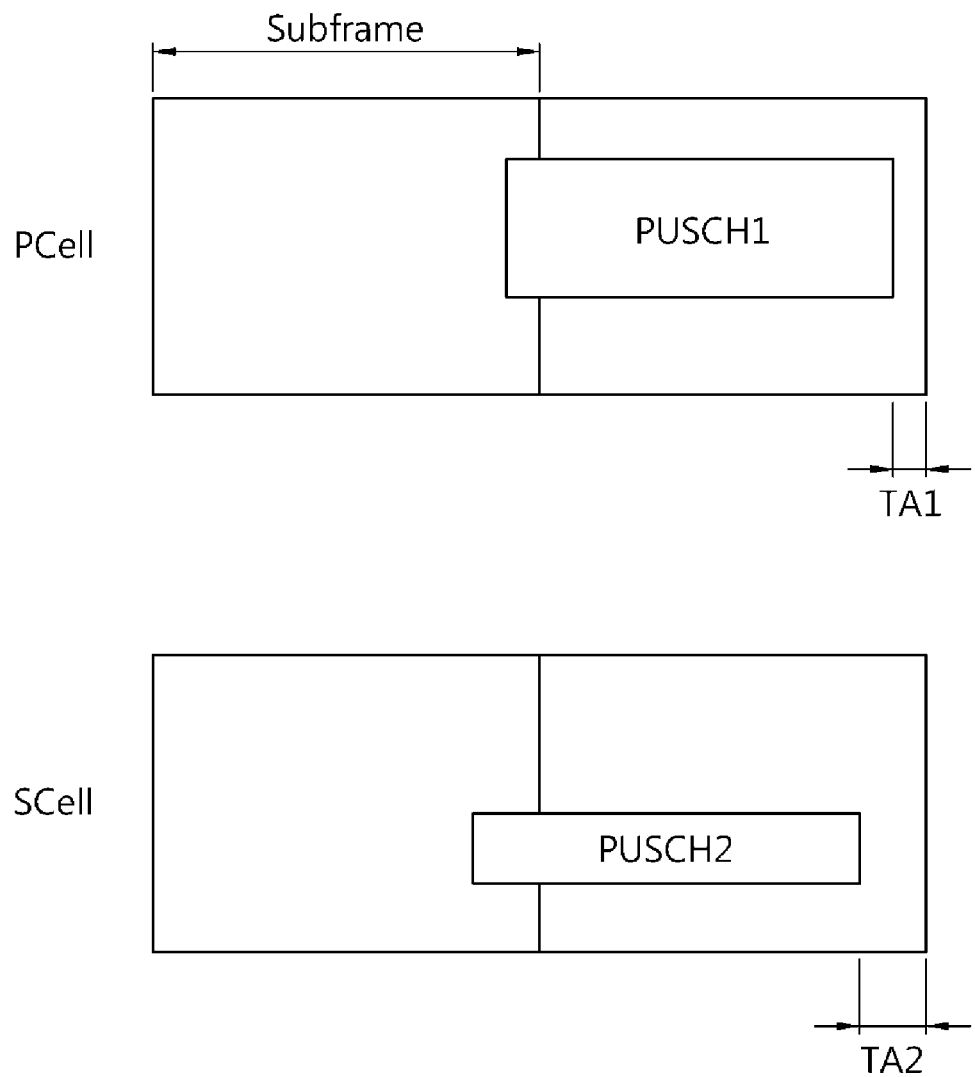
FIG. 6 shows an example in which a timing advance (TA) varies among multiple cells.

FIG. 6 illustrates an example of when a TA between a plurality of cells is changed.

An actual TA of a primary cell is 'TA 1' and an actual TA of a secondary cell is 'TA 2'. Accordingly, it is necessary that a separate TA should be applied to each serving cell.

In order to apply a separate TA, a TA group is defined. The TA group includes one or more cells to which the same TA is applied. TA is applied by each TA group, and a time alignment timer operates by each TA group.

Hereinafter, in consideration of two serving cells (i.e. a first serving cell and a second serving cell), a first serving cell belongs to a first TA group and a second serving cell belongs to a second TA group. The numbers of serving cells and TA groups are for exemplary purposes only. The first serving cell may be a primary or secondary cell, and the second serving cell may be a primary or secondary cell.

A TA group may include at least one serving cell. A base station may notify Information on a configuration of a TA group to a terminal.

If it is assumed that each TA group operates an independent power amp, a UL maximum transmit power of a UE may be limited for each TA group. Therefore, according to an embodiment of the present invention, a configured maximum transmit power $P_{CMAX}$ may be defined for each TA group. $P_{CMAX,T}$ is a maximum transmit power configured to a TA group T, and cells belonging to the TA group T may use $P_{CMAX,T}$ instead of $P_{CMAX}$ to obtain a transmit power and a power headroom (PH) of Equations 1 to 4.

The value $P_{CMAX,T}$ may be determined according to a power class of a UE and a structure of a power amp, or may be given for each TA group by a BS to the UE by using an RRC message or the like. The BS may transmit to the UE a parameter, which is used by the UE to determine $P_{CMAX,T}$, by using an RRC message, a MAC message, etc.

For each TA group, the UE may transmit information regarding a maximum transmit power $P_{CMAX,c}$ of a cell c belonging to each TA group to the BS by using a MAC message, an RRC message, a PUSCH, etc. The information may be transmitted in the cell c.

The UE may report a power headroom (PH) for each TA group. The PH may be obtained by applying Equation 4 described above on the basis of $P_{CMAX,T}$. The UE may transmit information regarding a difference between $P_{CMAX,T}$ and a current transmit power of all cells belonging to the TA group to the BS by using a MAC message, an RRC message, etc. The PH may be transmitted as a value for one TA group through one PUSCH, or may be transmitted as a value for all TA groups through one PUSCH. When the value for one TA group is transmitted through one PUSCH, the PUSCH may be transmitted in a cell belonging to the TA group.

It is assumed a case where the UE reports the PH by considering all TA groups, and subframe timing is misaligned among a plurality of TA groups. In a subframe n, the UE can report the PH by considering transmission in the subframe n of each TA group. For example, when transmission in a subframe n of a first TA group overlaps with transmission in a subframe n+1 or a subframe n−1 of a second TA group, the PH may be calculated and reported by considering only transmission in a subframe n of all TA groups.

If UL transmission in a subframe n of a TA group overlaps with UL transmission or a different TA group, the PH may be obtained by considering the UL transmission of the different TA group in an overlapping portion, and a greatest PH or a smallest PH or a PH in the overlapping portion may be reported to the BS.

Now, a method of controlling a UL transmit power for each TA group will be described.

Hereinafter, it is assumed that there are two TA groups of which a total transmit power sum is defined to Pmax. However, this is for exemplary purposes only. A first serving cell belongs to a first TA group, and a second serving cell belongs to a second TA group.

C1,n denotes a UL signal transmitted in a subframe n of the first serving cell. C1,n+1 denotes a UL signal transmitted in a subframe n+1 of the first serving cell. C2,m denotes a UL signal transmitted in a subframe m of the second serving cell. C2,m+1 denotes a UL signal transmitted in a subframe m+1 of the second serving cell. The subframes n and m may have the same subframe number or may have different subframe numbers. The UL signal may include at least one of a PRACH, a PUCH, a PUSCH, and an SRS. Hereinafter, P1 denotes a transmit power to be applied to transmission of C2,m, and P100 denotes a transmit power to be applied to transmission of C1,n+1.

Since an independent TA is applied for each TA group, if a boundary of a transmission time unit (e.g., a subframe) of cells belonging to different TA groups is misaligned, a problem may arise in a transmit power control of the UE.

Hereinafter, it is proposed a method of controlling a transmit power to prevent the total transmit power of the UE from exceeding Pmax.

When the UE simultaneously transmits a plurality of UL signals (or UL channels) in different TA groups, it is proposed a power limitation rule for reducing the total transmit power to be less than or equal to Pmax if the total transmit power exceeds Pmax. The power limitation rule may be applied according to a priority for each UL channel. For example, the priority may be given in the order of a PUCCH, a PUSCH having UCI, and a PUSCH, and power reduction may be achieved starting from a channel having a low priority. Alternatively, power reduction may be achieved in the same ratio between the same UL channels (i.e., between PUSCHs or between SRSs). Transmission of a specific UL channel may be dropped or discarded.

Figure 7:
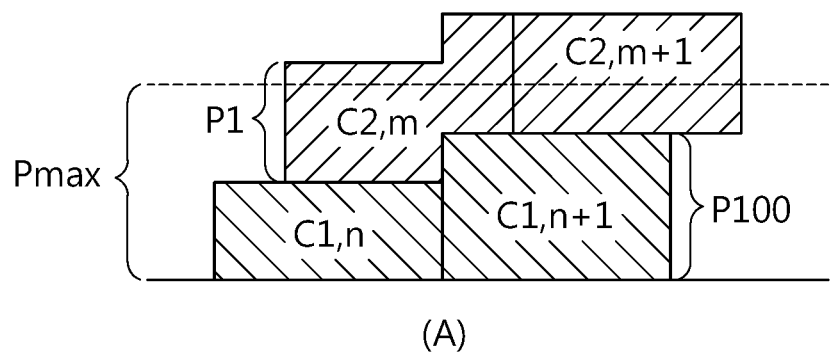
FIG. 7 shows a method of controlling a transmit power according to an embodiment of the present invention.
Figure 7:
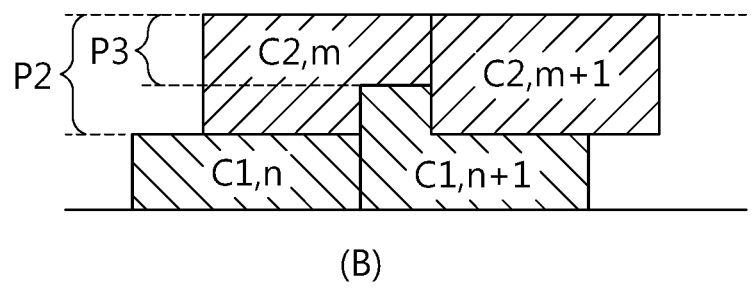

FIG. 7 shows a method of controlling a transmit power according to an embodiment of the present invention.

When a UE transmits UL signals transmitted in first and second serving cells without having to apply the total power limitation Pmax, it can be expressed by FIG. 7(A). A change in the transmit power is significant at a subframe boundary of each cell.

FIG. 7(B) shows that a transmit power of each UL signal is adjusted by applying a power limitation rule so that the power does not exceeds Pmax in a unit of each subframe boundary.

In a duration in which a signal C2,m to be transmitted with a transmit power P1 overlaps with C1,n, the transmit power is adjusted to a transmit power P2 by applying the power limitation rule to C1,n and C2,m. In a duration of overlapping with C1,$n$+1, the transmit power is adjusted to a transmit power P3 by applying the power limitation rule to C1,$n$+1 and C2,$m$.

If transmission of the UL signal to the first serving cell overlaps partially or entirely with transmission of the UL signal to the second serving cell, the total transmit power in the overlapping portion may be adjusted not to exceed Pmax.

Figure 8:
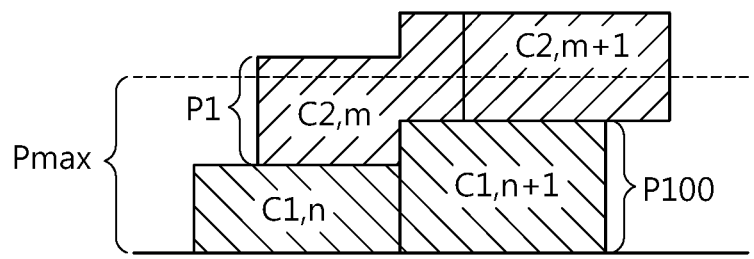
FIG. 8 shows a method of controlling a transmit power according to another embodiment of the present invention.
Figure 8:
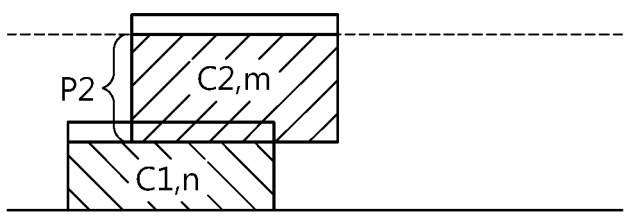
Figure 8:
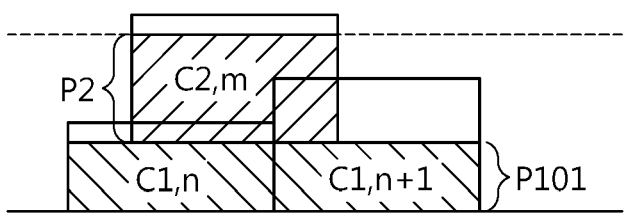
Figure 8:
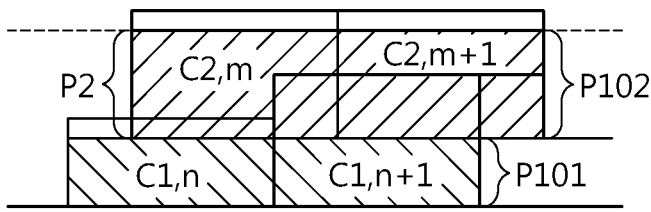

FIG. 8 shows a method of controlling a transmit power according to another embodiment of the present invention.

A UE adjusts a transmit power by applying a power limitation rule for UL signals which overlap in a start portion of the UL signal, and thereafter maintains the transmit power without alternation. A UL signal(s) which overlaps only in an end portion of the UL signal is subjected to power adjustment within the remaining transmit power obtained by subtracting a transmit power of the UL signal from Pmax.

When transmission of the UL signal starts in a first serving cell, if a transmission start portion does not overlap with a signal of which transmission starts previously in a second serving cell, the transmit power of the UL signal to the first serving cell may be determined by considering another UL signal.

FIG. 8(A) shows a case before adjusting a transmit power.

In FIG. 8(B), a transmit power of C2,$m$ is determined to P2 by applying the power limitation rule together with C1,$n$ which overlaps in a start portion of C2,$m$.

In the following figure, a blank box implies a power to be transmitted when each signal does not consider power limitation, and a hatched box implies a reduced transmit power.

In FIG. 8(C), a transmit power of C1,$n$+1 is determined within the remaining power obtained by subtracting the transmit power P2 of C2,$m$ from Pmax.

In FIG. 8(D), a transmit power of C2,$m$+1 is determined within the remaining power obtained by subtracting the determined transmit power P101 from C1,$n$+1.

When a transmit power to a specific cell is determined in a specific subframe, it may be determined not to exceed a power subtracted from Pmax in consideration of a transmit power of a UL signal which overlaps by being transmitted in a previous subframe of another cell. As shown in FIG. 8(B), when a maximum power of C1,$n$+1 is determined after a transmit power of C1,$n$ and C2,$m$ is determined, a maximum power that can be allocated to C1,$n$+1 is a power obtained by subtracting a transmit power of a signal subsequent to a previous subframe from Pmax, that is, a power obtained by subtracting a transmit power P2 of C2,$m$ from Pmax. If the transmit power of C1,$n$+1 is greater than a maximum transmit power as a result of applying a power limitation rule for C2,$m$+1 and C1,$n$+1, power adjustment can be achieved again not to exceed the maximum transmit power.

Figure 9:
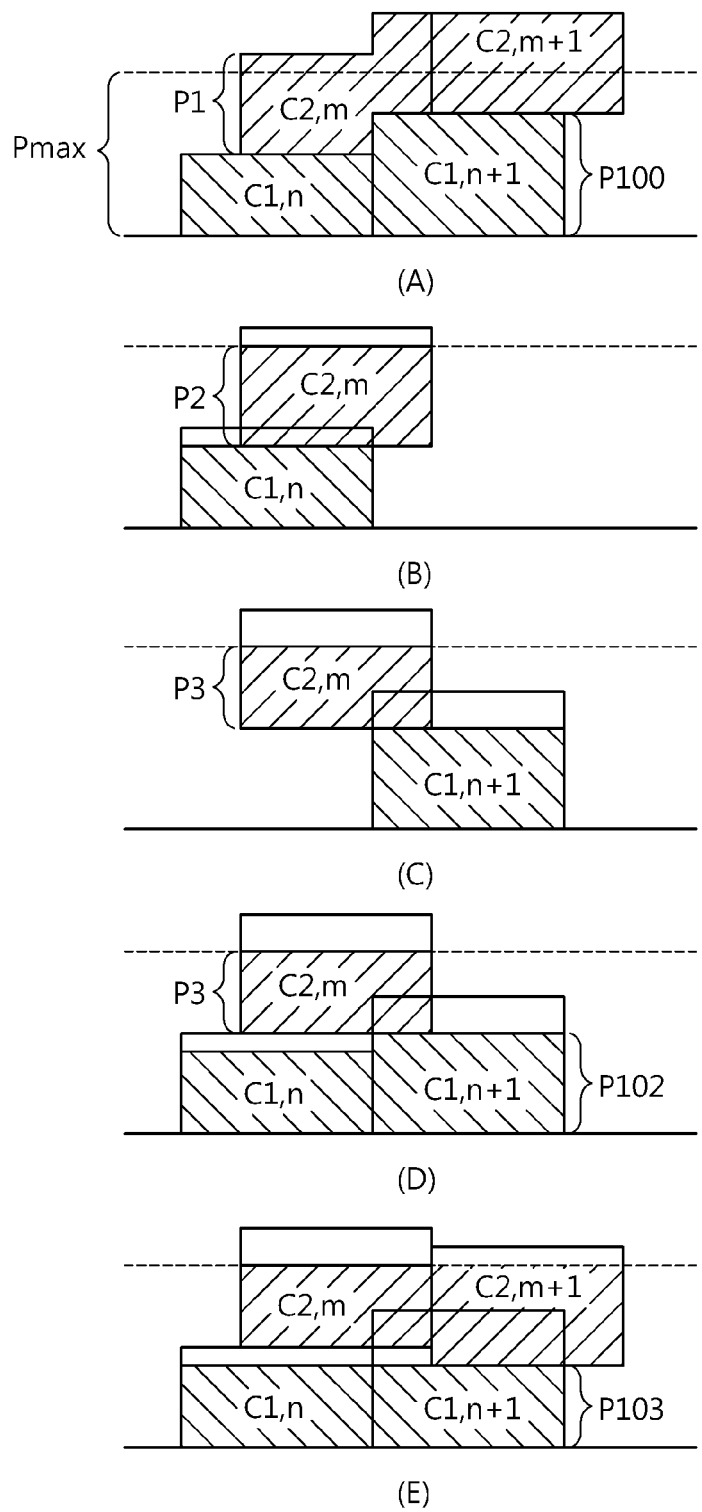
FIG. 9 shows a method of controlling a transmit power according to another embodiment of the present invention.

FIG. 9 shows a method of controlling a transmit power according to another embodiment of the present invention.

It is proposed herein that the transmit power is adjusted in the order of duration in which UL signals of two cells overlap.

If the UL signals transmitted to two cells overlap, a transmit power of a first transmitted UL signal is adjusted by applying a power limitation rule according to an overlapping duration. This method can be applied recursively for consecutive subframes.

FIG. 9(A) shows a case before adjusting a transmit power. Since C1,$n$ and C2,$m$ overlap and C1,$n$ is first transmitted, a transmit power of C1,$n$ is determined by applying the power limitation rule to C1,$n$ and C2,$n$.

In FIG. 9(B), a transmit power of C2,$m$ is adjusted from P1 to P2

In FIGS. 9(C) and (D), since an end portion of C2,$m$ overlaps with a start portion of C1,$n$+1, a transmit power of C2,$m$ is adjusted to P3 by applying the power limitation rule to the two signals, and a transmit power of C1,$n$+1 is adjusted to P102.

In FIG. 9(E), the transmit power of C1,$n$+1, which is adjusted to P102, is finally determined to P103 by considering a portion overlapping with C2,$m$+1.

As a modification of the method above, when a UL signal transmitted to a first serving cell overlaps with two signals transmitted to a second serving cell, a smaller transmit power may be selected between transmit powers obtained by applying a power limitation rule to each of the first and second UL signals.

For example, in FIG. 9(A), C2,$m$ overlaps with C1,$n$ and C2,$n$+2 in consecutive time durations. In this case, as shown in FIG. 9(B), a transmit power is adjusted to P2 when it is adjusted together with C1,$n$, and is adjusted to P3 when it is adjusted together with C1,$n$+1. If P3<P2, a transmit power of C2,$m$ is P3. This process may also be repeated for C1,$n$+1. That is, C1,$n$+1 is transmitted with a transmit power P103 which is a smaller power between a transmit power adjusted with C2,$m$ and a transmit power adjusted with C2,$m$+1. In this case, a transmit power of C1,$n$+1 adjusted with C2,$m$+1 may be determined based on a transmit power which has already been adjusted one time with C2,$n$ or based on an original transmit power before being adjusted with C2,$n$.

The power adjustment of two cells may always start with the same subframe number, i.e., m=n.

Figure 10:
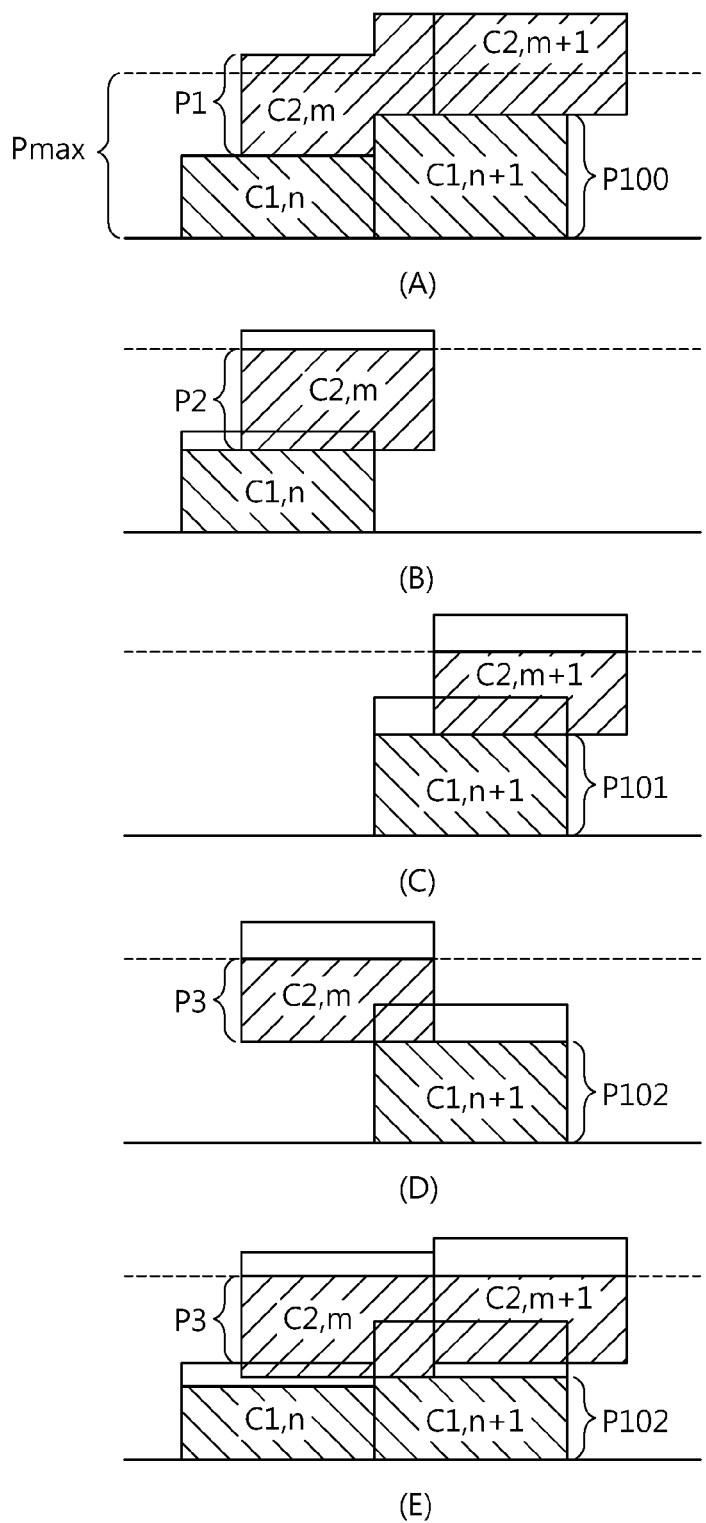
FIG. 10 shows a method of controlling a transmit power according to another embodiment of the present invention.

FIG. 10 shows a method of controlling a transmit power according to another embodiment of the present invention.

It is proposed herein that subframe numbers are identical as m=n, and subframes with the same subframe number are first subjected to transmit power adjustment, and thereafter overlapping different subframes are readjusted.

For UL signals transmitted to different cells, a tentative transmit power is determined by respectively applying power limitation rules to overlapping portions in the subframes having the same subframe number. A final transmit power is determined by applying the power limitation rule to an overlapping portion in adjacent subframes.

FIG. 10(A) shows a case before adjusting a transmit power.

In FIG. 10(B), a transmit power of C2,$m$ is determined to P2 by applying the power limitation rule to C2,$m$ and C1,$n$.

In FIG. 10(C), a transmit power of C1,$n$+1 is determined to P101 by applying the power limitation rule to C2,$m$+1 and C1,$n$+1.

In FIG. 10(D), since C2,$m$ and C1,$n$+1 overlap in consecutive subframes, a transmit power of C2,$m$ is finally determined to P3 by applying the power limitation rule. Herein, the rule is applied under the assumption that C1,$n$+1 is transmitted with P101.

FIG. 10(E) shows a finally determined transmit power.

It may be requested to guarantee a constant transmit power only for a UL signal having a specific format during a specific time duration. For example, a PUCCH for carrying ACK/NACK or a PRACH may maintain a transmit power determined in initial transmission based on one transmission unit, and thereafter a transmit power of UL signals to another cell overlapping with a corresponding signal may be properly adjusted or a change in a transmit power may be allowed within one transmission unit. In addition, when a UL channel is modulated using a high-level modulation scheme (e.g., 16-QAM, 64-QAM, etc.), the constant transmit power may be guaranteed as described above. If PUSCH transmission using the higher-level modulation scheme overlaps with PUSCH transmission using a lower-level modulation scheme (e.g., BPSK or QPSK) in some subframes, a transmit power of PUSCH transmission using the lower-level modulation scheme may be adjusted in an overlapping portion or in the entirety of the subframe.

The aforementioned embodiments 7 to 10 may be combined. For example, since a PUCCH or a PRACH is a signal relatively important in comparison with other UL signals, a transmit power is determined only for one overlapping duration by applying the embodiment of FIG. 8, and then the determined transmit power is maintained. A PUSCH may be subjected to power adjustment by considering all durations overlapping with the PUSCH by applying the embodiments of FIG. 7, FIG. 9, and FIG. 10.

A priority used for assignment of a transmit power may be set for each TA group. For example, a higher priority may be set to a TA group of a primary cell in comparison with another TA group. As to cells belonging to a TA group having a low priority, a transmit power may be preferentially reduced or transmission may be dropped. In addition, when a TA group index is assigned to a plurality of TA groups, a priority may be put on a transmit power assignment in a low TA group index (or high TA group index) order, and a transmit power to a cell belonging to a high TA group index (or low TA group index) may be preferentially reduced. A lowest TA group index (e.g., 0) may be assigned to the TA group to which the primary cell belongs.

When a plurality of TA groups simultaneously transmit a plurality of UL signals, if a total transmit power exceeds a maximum transmit power, some of the UL signals may not be transmitted through rate-matching/puncturing. When a first UL signal transmitted in a first TA group overlaps with a second UL signal transmitted in a second TA group, if a total transmit power in an overlapping portion exceeds a maximum transmit power, one of the first and second UL signals may not be transmitted through rate-matching/puncturing in the overlapping portion.

In this case, which UL signal will be subjected to rate-matching/puncturing may be determined in the following order. Some OFDM symbols of PUSCH or PUCCH overlapping with SRS may be subjected to rate-matching/puncturing. Some OFDM symbols of PUSCH overlapping with PUCCH may be subjected to rate-matching/puncturing. Some OFDM symbols of PUSCH overlapping with PUSCH may be subjected to rate-matching/puncturing.

When a first UL signal transmitted in a first subframe to a first serving cell overlaps with a second UL signal(s) transmitted in two subframes overlapping in the first subframe to a second serving cell, it can be said that a transmit power of the UL signal is determined by using a transmit power of the second UL signal(s).

The above embodiments are applicable to determine a transmit power of SRS when a subframe boundary of another cell exists within an OFDM symbol for transmitting the SRS in one cell.

As described above in the proposed embodiment, a method in which a plurality of TA groups are configured and a transmit power is adjusted due to a misalignment of subframe timing among the TA groups may be applied when a TA is misaligned among the plurality of TA groups by more than a specific threshold. The threshold may be predetermined or may be delivered by a BS to a UE.

Different methods may be applied to a case where the misalignment of the subframe timing (or a duration in which transmission overlaps among a plurality of TA groups) is greater than or equal to the threshold and a case where it is less than or equal to the threshold. For example, if the subframe timing is misaligned by more than the threshold, some of UL signals may be subjected to dropping/puncturing/rate-matching, and if the subframe timing is misaligned by less than the threshold, a transmit power of some signals may be reduced. On the contrary, if the subframe timing is misaligned by less than the threshold, some of the UL signals may be subjected to dropping/puncturing/rate-matching, and if it is misaligned by more than the threshold, a transmit power of some signals may be reduced.

If an overlapping duration is less than or equal to a specific length (e.g., one OFDM symbol), a transmit power of some channels or all channels may be reduced only in the OFDM symbol or in the overlapping duration. Otherwise, a transmit power of some channels or all channels may be reduced in all transmission durations.

As to a PUSCH modulated using phase modulation such as BPSK/QPSK, a transmit power of an overlapping OFDM symbol in the above case may be reduced. As to a PUSCH modulated using QAM-type modulation such as 16QAM, 64QAM, etc., transmission of the overlapping OFFDM symbol may be dropped by applying puncturing/rate-matching, etc. This is because, if a transmit power is reduced for a specific OFDM symbol, QAM demodulation capability on the OFDM symbol may not be guaranteed.

Figure 11:
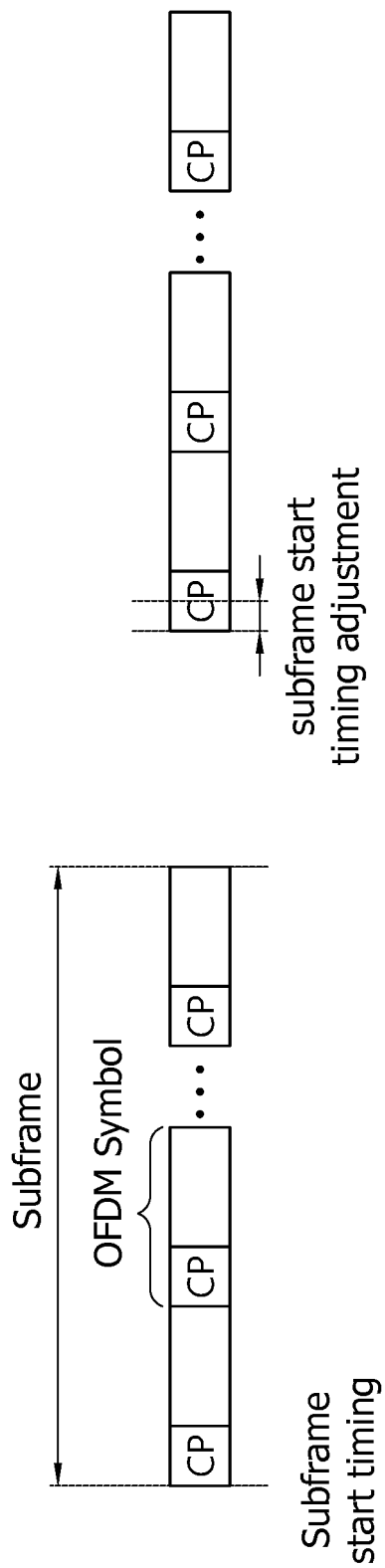
FIG. 11 shows an example of TA adjustment for a TA group.

FIG. 11 shows an example of TA adjustment for a TA group.

When a plurality of TA groups are configured, subframe timing for UL transmission in a plurality of cells within each TA group is equally applied, whereas independent subframe timing may be applied for each TA group.

Subframe start timing (hereinafter, transmission timing) in one cell may be adjusted by using a TA command or the like within a random access response.

Figure 12:
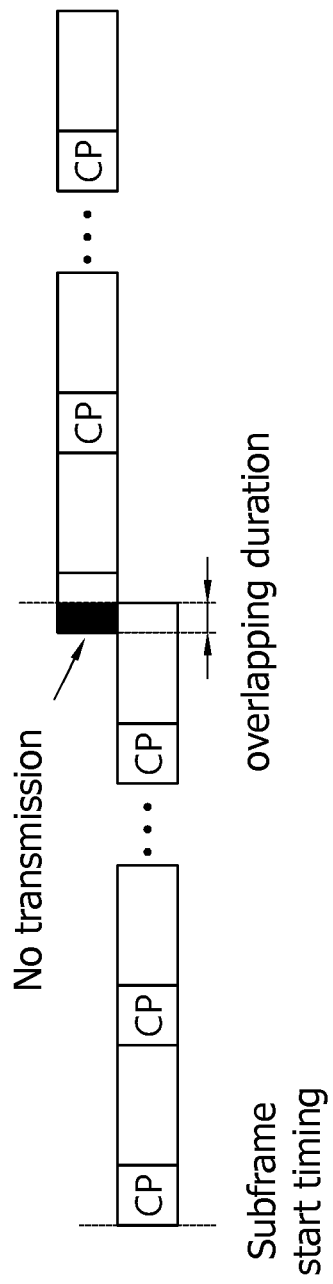
FIG. 12 shows overlapping caused by transmission timing adjustment.

FIG. 12 shows overlapping caused by transmission timing adjustment.

If UL transmission signals overlap between consecutive subframes due to transmit timing adjustment with respect to the same cell, a portion overlapping with a UL signal of a precedent subframe among UL signals (PUCCH, PUSCH, etc.) in a subsequent subframe may not be transmitted. This is because a start portion of a signal transmitted through a subframe includes a cyclic prefix (CP) of an OFDM symbol (or OFDM symbol), and even if the CP is lost, may have a relatively less data loss opportunity than other portions.

The present invention proposes that transmission timing is adjusted by applying a TA command in cells belonging to the same TA groups, and if a subframe n overlaps with a subframe n+1 as a result, an overlapping portion (i.e., all or some of OFDM symbols) of the subframe n+1 and the subframe n is not transmitted.

The subframe n and the subframe n+1 may belong to the same cell or may belong to different cells belonging to the same TA group.

This is because a UE complexity may be significantly increased when a UE transmits a radio signal by using the same RF module (i.e., power amp, etc.) with respect to cells belonging to the same TA group and the same RF modules transmits a radio signal at different timings.

For example, if a TA command is received in a subframe n−6, the adjustment of UL transmission timing may be applied starting from a subframe n. If transmission of a UL signal (PUCCH/PUSCH/SRS, etc.) of the UE overlaps in a subframe n−1 and a subframe n due to the adjustment of transmission timing with respect to serving cells belonging to the same TA group, the UE may complete transmission in the subframe n−1 and may not transmit an overlapping portion of the subframe n.

As to cells belonging to different TA groups, the UE may perform transmission directly even if transmission overlaps due to the transmission timing adjustment based on the TA command. This is because transmission for different TA groups is performed independently by different RF modules, and thus does not have a significant effect on a UE complexity even if signals are transmitted at different timings.

Figure 13:
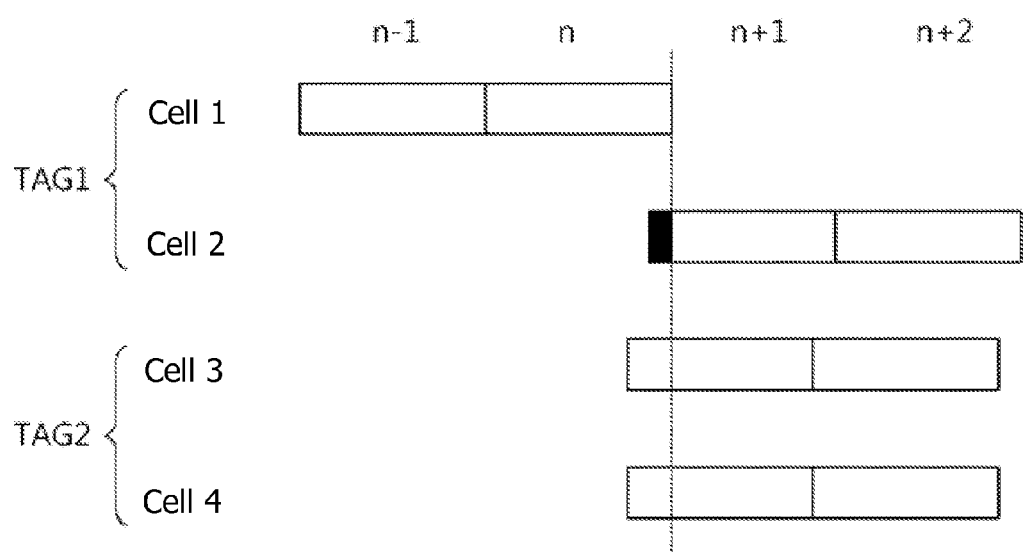
FIG. 13 shows UL transmission according to an embodiment of the present invention.

FIG. 13 shows UL transmission according to an embodiment of the present invention.

An end portion of a UL signal transmitted in a subframe n to a cell 1 belonging to a first TA group (TAG1) overlaps with a start portion of a UL signal transmitted in a subframe n+1 to a cell 2 belonging to the first TAG1 due to timing adjustment depending on a TA command. A UE does not transmit an overlapping portion among UL channels transmitted to the cell 2.

A UL channel transmitted in a subframe n+1 of a cell 3 or cell 4 belonging to a second TA group (TAG2) is transmitted irrespective of timing adjustment of the first TAG1.

Whether transmission is performed in an overlapping portion in the consecutive subframes may be reported by a BS to the UE.

Figure 14:
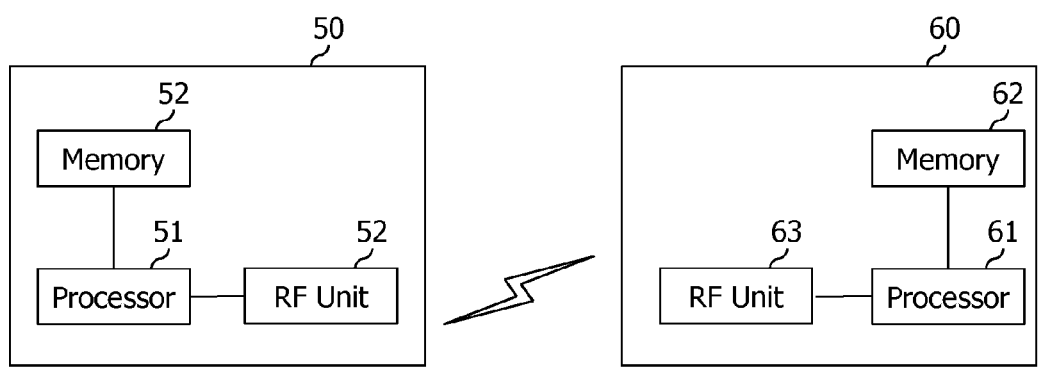
FIG. 14 is a block diagram showing a wireless communication system according to an embodiment of the present invention.

FIG. 14 is a block diagram showing a wireless communication system according to an embodiment of the present invention.

A BS 50 includes a processor 51, a memory 52, and a radio frequency (RF) unit 53. The memory 52 is coupled to the processor 51, and stores a variety of information for driving the processor 51. The RF unit 53 is coupled to the processor 51, and transmits and/or receives a radio signal. The processor 51 implements the proposed functions, procedures, and/or methods. In the aforementioned example, a serving cell and/or a TA group can be controlled/managed by the BS, and an operation of one or more cells can be implemented by the processor 51.

A wireless device 60 includes a processor 61, a memory 62, and an RF unit 63. The memory 62 is coupled to the processor 61, and stores a variety of information for driving the processor 61. The RF unit 63 is coupled to the processor 61, and transmits and/or receives a radio signal. The processor 61 implements the proposed functions, procedures, and/or methods. In the aforementioned embodiment, an operation of the UE can be implemented by the processor 61.

The processor may include Application-Specific Integrated Circuits (ASICs), other chipsets, logic circuits, and/or data processors The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

The invention claimed is:

1. A method for uplink transmission in a wireless communication system, the method performed by a user equipment and comprising:
    applying a first timing advance to a first serving cell and a second serving cell in order to adjust uplink timing, wherein the first timing advance is applied when the first serving cell and the second serving cell belong to a first group;
    applying a second timing advance to a third serving cell, wherein the second timing advance is applied when the third serving cell does not belong to the first group, but belongs to a second group; and
    if an uplink transmission toward one of the first serving cell and the second serving cell belonging to the first group at $n^{th}$ subframe and an uplink transmission of the third serving cell belonging to the second group at $(n+1)^{th}$ subframe are overlapped, determining whether to adjust the total uplink transmission power or drop the uplink transmission at the $n^{th}$ subframe.

2. The method of claim 1, wherein an uplink signal used for the uplink transmission of the first serving cell includes at least one of a physical uplink control channel (PUCCH), a physical uplink shared channel (PUSCH) and a sounding reference signal (SRS), and
    wherein an uplink signal used for the uplink transmission of the second serving cell includes at least one of a PUCCH, a PUSCH and a SRS.

3. The method of claim 1, further comprising:
    receiving information about a first time alignment timer for the first group and information about a second time alignment timer for the second group;
    receiving a timing advance command for the first group; and
    starting or restarting the first time alignment timer upon applying the timing advance command.

4. The method of claim 3, wherein the timing advance command is received at $(n-6)^{th}$ subframe and the timing advance command is applied at the $n^{th}$ subframe.

5. The method of claim 1, wherein the overlapped portion includes a part of an orthogonal frequency division multiplexing (OFDM) symbol.

6. A user equipment for uplink transmission in a wireless communication system, the user equipment comprising:
    a radio frequency (RF) unit configured to transmit and receive radio signals; and
    a processor operatively coupled with the RF unit and configured to:
    apply a first timing advance to a first serving cell and a second serving cell in order to adjust uplink timing, wherein the first timing advance is applied when the first serving cell and the second serving cell belong to a first group;
    apply a second timing advance to a third serving cell, wherein the second timing advance is applied when the third serving cell does not belong to the first group, but belongs to a second group; and
    if an uplink transmission toward one of the first serving cell and the second serving cell belonging to the first group at $n^{th}$ subframe and an uplink transmission of the third serving cell belonging to the second group at $(n+1)^{th}$ subframe are overlapped, determine whether to adjust the total uplink transmission power or drop the uplink transmission at the $n^{th}$ subframe.

7. The user equipment of claim 6, wherein an uplink signal used for the uplink transmission of the first serving cell includes at least one of a physical uplink control channel (PUCCH), a physical uplink shared channel (PUSCH) and a sounding reference signal (SRS) and
wherein an uplink signal used for the uplink transmission of the second serving cell includes at least one of a PUCCH, a PUSCH and a SRS.

8. The user equipment of claim 6, wherein the processor is further configured to:
receive information about a first time alignment timer for the first group and information about a second time alignment timer for the second group;
receive a timing advance command for the first group; and
start or restart the first time alignment timer upon applying the timing advance command.

9. The user equipment of claim 8, wherein the timing advance command is received at $(n-6)^{th}$ subframe and the timing advance command is applied at the $n^{th}$ subframe.

10. The user equipment of claim 6, wherein the overlapped portion includes a part of an orthogonal frequency division multiplexing (OFDM) symbol.

11. The method of claim 1, wherein it is determined to drop the uplink transmission at the $n^{th}$ subframe if a total uplink transmission power exceeds a maximum value and if the uplink transmission at the $n^{th}$ subframe is to transmit a sounding reference signal (SRS).

12. The method of claim 1, wherein it is determined to adjust the total uplink transmission power if the uplink transmission at the $n^{th}$ subframe is to transmit a sounding reference signal (SRS).

13. The method of claim 3, further comprising:
if an uplink transmission toward the first serving cell at $n^{th}$ subframe and an uplink transmission toward the second serving cell at $(n+1)^{th}$ subframe are overlapped due to the uplink timing adjustment while the first time alignment timer is running, completing the uplink transmission of the $n^{th}$ subframe and not transmitting the overlapped portion of the $(n+1)^{th}$ subframe.

* * * * *